(12) United States Patent
Ruth et al.

(10) Patent No.: US 11,441,969 B2
(45) Date of Patent: Sep. 13, 2022

(54) METHOD FOR DETERMINING THE RELATIVE POSITION OF A GAS LEAK

(71) Applicant: INFICON GmbH, Cologne (DE)

(72) Inventors: Marcel Ruth, Cologne (DE); Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 17/052,577

(22) PCT Filed: May 2, 2019

(86) PCT No.: PCT/EP2019/061245
§ 371 (c)(1),
(2) Date: Nov. 3, 2020

(87) PCT Pub. No.: WO2019/211378
PCT Pub. Date: Nov. 7, 2019

(65) Prior Publication Data
US 2021/0239562 A1    Aug. 5, 2021

(30) Foreign Application Priority Data

May 4, 2018    (DE) ..................... 10 2018 206 877.1

(51) Int. Cl.
*G01M 3/20*        (2006.01)
*G01M 3/16*        (2006.01)

(52) U.S. Cl.
CPC .............. *G01M 3/207* (2013.01); *G01M 3/16* (2013.01)

(58) Field of Classification Search
CPC ........ G01M 3/20; G01M 3/202; G01M 3/205; G01M 3/207
See application file for complete search history.

(56) References Cited

U.S. PATENT DOCUMENTS

| | | | | |
|---|---|---|---|---|
| 7,159,445 B2 * | 1/2007 | Bohm | .................... | G01M 3/205 73/23.2 |
| 8,528,386 B2 * | 9/2013 | Grosse-Bley | ......... | G01M 3/205 73/40.7 |

(Continued)

FOREIGN PATENT DOCUMENTS

| | | |
|---|---|---|
| WO | 0248686 A2 | 6/2002 |
| WO | 2009098302 A1 | 8/2009 |

*Primary Examiner* — Erika J. Villaluna
(74) *Attorney, Agent, or Firm* — The Webb Law Firm

(57) ABSTRACT

A method for determining the relative orientation of a gas leak relative to a sniffer leak detector includes
  a handpiece with a sniffer probe and a test gas inlet,
  a reference gas inlet disposed at the handpiece remote from the test gas inlet,
  a gas analyzer, and
  a switching valve.
The switching valve is configured to alternately connect the test gas inlet and the reference gas inlet with the gas analyzer. Either gas is analyzed by the gas analyzer. Steps include
  supplying gas sucked in through the test gas inlet to the gas analyzer,
  determining the test gas concentration,
  switching the switching valve,
  supplying gas sucked in through the reference gas inlet to the gas analyzer,
  analyzing the test gas concentration,
  forming a differential signal,
  changing the spatial orientation of the handpiece,
  repeating the first through sixth steps, and
  determining whether the differential signal has changed.

12 Claims, 2 Drawing Sheets

(56) References Cited

U.S. PATENT DOCUMENTS

| | | |
|---|---|---|
| 2004/0051043 A1 | 3/2004 | Kilian et al. |
| 2004/0194533 A1 | 10/2004 | Bohm et al. |
| 2009/0288477 A1 | 11/2009 | Grosse Bley et al. |
| 2010/0326169 A1 | 12/2010 | Grosse-Bley et al. |

\* cited by examiner

METHOD FOR DETERMINING THE RELATIVE POSITION OF A GAS LEAK

CROSS-REFERENCE TO RELATED APPLICATIONS

This application is the United States national phase of International Application No. PCT/EP2019/061245 filed May 2, 2019, and claims priority to German Patent Application No. 10 2018 206 877.1 filed May 4, 2018, the disclosures of which are hereby incorporated by reference in their entirety.

BACKGROUND OF THE INVENTION

Field of the Invention

The disclosure relates to a method for determining the relative spatial position or direction of a gas leak relative to a sniffer leak detector.

Description of Related Art

Sniffer leak detection is described as a method for gas detection in WO 02/48686 A2, for example. Sniffer leak detectors typically comprise a test gas inlet through which the gas to be analyzed (test gas) is sucked in, and a reference gas inlet through which a gas from the surrounding environment is sucked in as a reference gas for comparison. Typically, a vacuum pump of the sniffer leak detector serves for sucking in the gas.

WO 02/48686 A2 and WO 2009/098302 A1 describe a test gas inlet and a reference gas inlet which are both disposed at the distal end of the sniffer tip of the sniffer probe. The sniffer tip is a component of a hand-guided device (handpiece).

A gas modulation valve connects the test gas inlet and the reference gas inlet with the gas analyzer. The test gas inlet is connected via a test gas line with the gas modulation valve. The reference gas inlet is connected via a reference gas line with the gas modulation valve. The gas modulation valve is connected with the gas analyzer in a gas conducting manner. The gas modulation valve is a switching valve which switches back and forth between the test gas line and the reference gas line and thus alternately connects either the test gas inlet or the reference gas inlet with the gas analyzer, respectively. In doing so, the gas analyzer is alternately provided with the gas sucked in through the test gas inlet and through the reference gas inlet depending on the switching state of the gas modulation valve.

In WO 02/48686 A2 the gas analyzer is an infrared gas analyzer with a test cuvette having an inlet through which the gas to be analyzed is sucked in. The gas is expelled through an outlet of the test cuvette. An infrared light source emits infrared radiation passing through the test cuvette and being received at its opposite end by an infrared detector.

Sniffer leak detectors of the above-described kind are typically configured to achieve a high sensitivity. The purpose of switching between the test gas inlet and the reference gas inlet is to computationally eliminate the quantity of test gas or interfering gas contained in the surrounding atmosphere from the measurement signal of the test gas. The test gas is the gas to be identified in the analyzed gas quantity, for example, a gas that is escaping through a leak and needs to be detected.

However, in sniffer leak detection not only a high sensitivity in gas analysis is desirable to detect small test gas quantities in the analyzed gas. It is also often desirable to rather enable a quick orientation within a large area in which a leak is assumed. This is not possible with conventional signal analysis by increasing the sensitivity.

For the localization of leaks, sniffer probes are often used in industrial leak testing, wherein the sniffer probes suck in the air and guide the air through a detection system. There are devices where the air flow sucked in at the measurement inlet is continuously guided through the detection system and devices in which the air flow is switched between two different inlets by a valve. The latter enables a permanent comparison of the concentrations of the gas mixtures at the corresponding inlet openings. The leak rate signal is then formed by forming the difference of the signal from the test gas inlet and from the reference gas inlet. Said method is referred to as gas switching modulation. If test gas, which is sucked in by the measurement probe, now escapes from a leaking test object being pressurized with gas, a measurement signal is generated which is dependent on the concentration of the mixture of air and test gas. If the concentration of said mixture during the gas switching modulation is identical in both gas flows, no leak rate is measured.

In this respect, the object of the disclosure is to provide a method for quickly determining the spatial orientation of a gas leak relative to a hand-guided sniffer leak detector.

The method is defined by this disclosure.

SUMMARY OF THE INVENTION

Accordingly, the following steps are performed to determine the relative orientation of a gas leak relative to a sniffer leak detector:

a) supplying gas sucked in through the test gas inlet to the gas analyzer,
b) determining the test gas concentration in the gas supplied to the gas analyzer,
c) switching the switching valve,
d) supplying gas sucked in through the reference gas inlet to the gas analyzer,
e) analyzing the test gas concentration in the gas supplied to the gas analyzer,
f) forming a differential signal from the difference of the test gas concentration determined according to step b) and the test gas concentration determined according to step e),
g) changing the spatial orientation of the handpiece,
h) repeating steps a)-f),
i) determining whether the differential signal has changed after step h) compared to the differential signal according to f).

The steps a)-e) are preferably repeated until the differential signal is minimum or maximum. If the difference of test gas concentration in the gas sucked in through the test gas inlet and of the test gas concentration in the gas sucked in through the reference gas inlet is approximately zero, the distances from the test gas inlet to the leak and from the reference gas inlet to the leak are almost the same. For a maximum differential signal, the distance from the test gas inlet to the leak is particularly small compared to the distance of the reference gas inlet to the leak. If the test gas inlet is disposed at the front, distal end of the sniffer tip and the reference gas inlet is disposed at the rear end of the handpiece, the sniffer tip points towards the gas leak in case of a maximum differential signal and points away from the gas leak in case of a minimum differential signal.

Preferably, the spatial orientation of the sniffer probe should not be changed between performing steps a) and d)

to prevent a change in the corresponding distances of the test gas inlet and the reference gas inlet to the leak.

By a change in the differential signal, the relative orientation of the leak to be localized relative to the handpiece can be deduced. In particular, the orientation of the handpiece can also be evaluated as an indication of the relative position or direction of the leak to be localized relative to the handpiece if the differential signal is maximum or minimum. If the test gas inlet is disposed at the sniffer tip and the reference gas inlet is disposed at the rear end of the handpiece, for example, the sniffer tip points, as described above, towards the leak in case of a maximum differential signal. In case of a minimum differential signal, the sniffer tip then points in the opposite direction away from the leak while the rear end of the handpiece is facing the leak According to the disclosure, the test gas quantity in the test gas is compared to the test gas quantity in the reference gas. By forming the difference between these two signals and by monitoring the change in the differential signal while changing the spatial of the sniffer leak detector or the handpiece, it is possible to detect the spatial position or direction of the leak relative to the orientation of the handpiece or the sniffer leak detector. If the differential signal is maximum or minimum, it can be assumed that the handpiece is pointing towards or away from the leak or is located on a geometric axis including the test gas inlet and the reference gas inlet.

When changing the spatial orientation of the handpiece according to method step g), the position of the handpiece and particularly the distance between the handpiece and the leak to be localized should not or only negligibly be changed compared to the change in the spatial orientation of the handpiece. "Spatial" refers to the direction in space in which the handpiece points or in which a geometric axis is orientated which passes through the test gas inlet and through the reference gas inlet.

A sufficiently large spatial separation of the measurement gas inlet and reference gas inlet (at least 10 cm, better 50 cm, preferably 100 cm) results in an increase in the differential signal that corresponds to the refrigerant gradient in the measurement cell, such that a rough localization of the leakage in the refrigerant clouds by means of a gas switch modulation and an observation of the differential signal upon movement in space is enabled. For this purpose, it is advisable to place the measurement gas inlet at the tip of a gooseneck and to position the reference gas inlet at the lower part of the handle. Due to the relative measurement with a sufficiently large inlet distance, the concentration gradient (differential signal) can already be detected by simply rotating the device and thus the rough direction can be determined, thus guiding the user even faster to the source of the refrigerant cloud. Negative differential signals indicate that the leak is located such that it faces the rear side of the device. The switching frequency between measurement gas and reference gas should be sufficiently high in order to map the movement of the leak detector and the movement of the refrigerant clouds in space (at least 1 Hz, better 10 Hz, preferably approximately 100 Hz).

The pre-localization in space can be carried out by the user by displaying and observing a numerical or graphical differential signal. By illustrating the temporal course correlating with the movement of the leak detector, the localization is further simplified. By using position sensors, a software can further assist the user in analyzing the position of the refrigerant clouds and can directly indicate the expected direction of the leakage source.

After successfully determining the system with the leakage, in the vicinity of which the refrigerant concentration is highest as the source of the refrigerant cloud, the leak can then be localized at said system. For this purpose, the valve is held in the measurement gas position and is thus switched to the proven continuous localization mode without gas switching modulation.

If the determined differential signal is approximately zero, i.e. almost or equal to zero, the leak to be localized is assumed to be disposed on a geometric axis which is transverse to an axis including the test gas inlet and the reference gas inlet. The leak to be localized is then located abeam to the sniffer leak detector.

Additionally, it is possible to use a position sensor and/or an acceleration sensor to detect the position of the sniffer leak detector and take it into account when determining the relative position or direction of the leak to be localized. For this purpose, the temporal course of the position/direction of the sniffer leak detector or of the position/direction change can be recorded and correlated with the determined differential signal. It is further possible to indicate the differential signal or its change to the user of the sniffer leak detector. For example, the signal or its change can be illustrated on a display and/or can be reproduced acoustically.

BRIEF DESCRIPTION OF THE DRAWINGS

In the following, exemplary embodiments of the disclosure are described in detail with reference to the figures in which.

DESCRIPTION OF THE INVENTION

Figure 1:
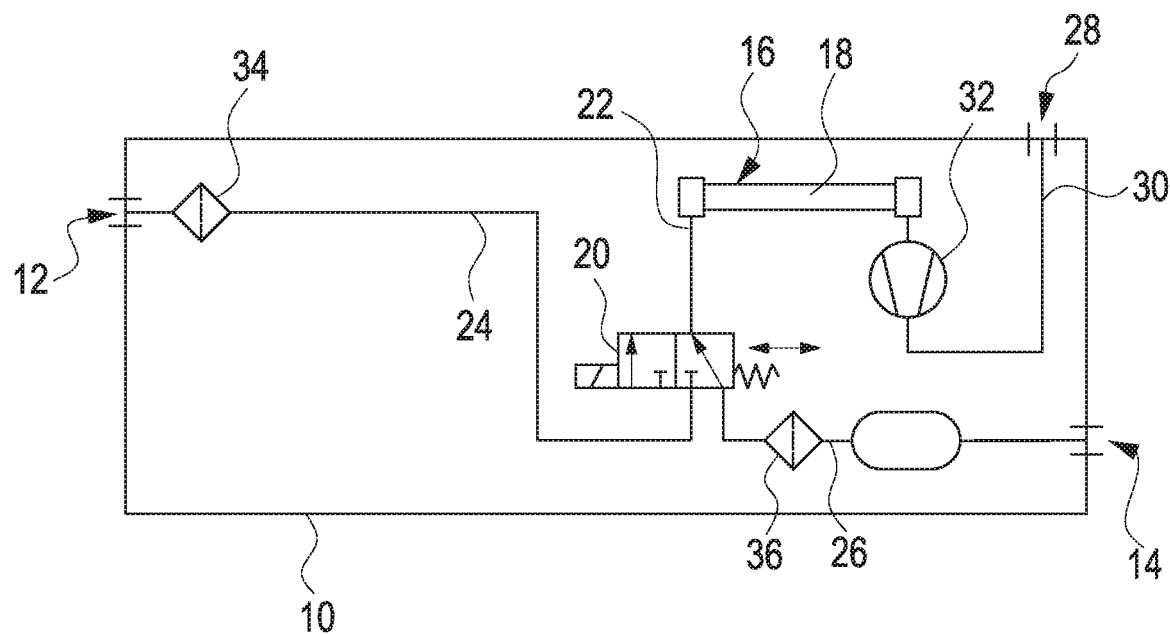
FIG. 1 shows a first exemplary embodiment.

In the exemplary embodiment in FIG. 1, the sniffer leak detector comprises a test gas inlet 12 and a reference gas inlet 14. The gas analyzer used herein is an infrared absorption analyzer with an absorption cuvette 18.

The sniffer leak detector 10 further comprises a switching valve 20 which is connected with the gas analyzer 16, namely the cuvette 18, via a first line 22. The test gas inlet 12 is connected with the switching valve via a test gas line 24. The reference gas inlet 14 is connected with the switching valve 20 via a reference gas line 26. The switching valve 20 is configured to alternately switch back and forth between the reference gas inlet 14 and the test gas inlet 12 by connecting either the test gas line 24 or the reference gas line 26 with the first line 22 and thereby with the gas analyzer 16. Thus, either the gas sucked in through the test gas inlet 12 or the gas sucked in through the reference gas inlet 14 is supplied to the gas analyzer 16 via the switching valve 20 for analysis. The absorption cuvette 18 of the gas analyzer 16 is connected with the gas outlet 28 of the sniffer leak detector 10 via a second line 30 which comprises a gas-conveying pump 32. The gas pump 32 is configured to create a continuous gas flow.

The test gas line 24 includes a test gas filter 34. The test gas line 26 includes a reference gas filter 36.

Figure 2:
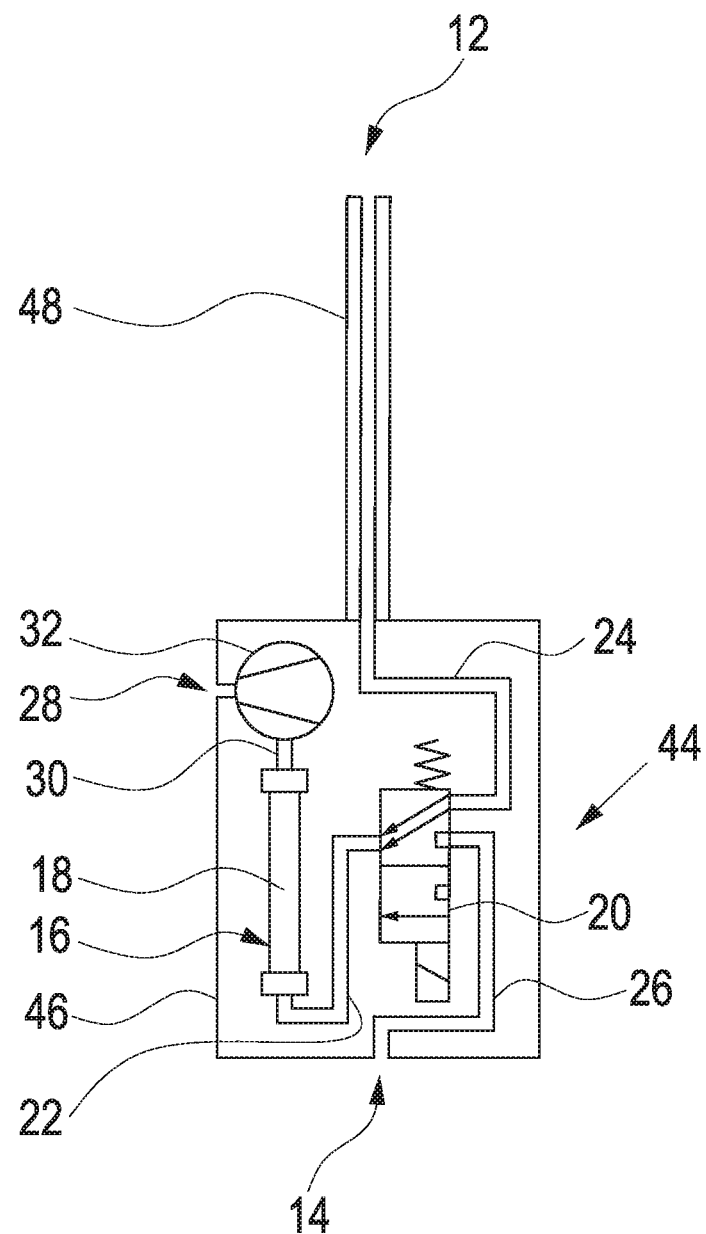
FIG. 2 shows a second exemplary embodiment.

In the exemplary embodiment shown in FIG. 2, the sniffer leak detector comprises a hand-guided device 44 with a housing 46 which is dimensioned to be held and guided by an operator of the sniffer leak detector 10. The housing 46 encloses the switching valve 20, the gas analyzer 16 with the absorption cuvette 18 and the gas pump 32 as well as the test gas line 24, the reference gas line 26, the first line 22 and the second line 30. The reference gas inlet 14 and the gas outlet 28 are formed through openings in the housing 46.

The handpiece 44 comprises an elongated sniffer probe 48 at whose distal end the test gas inlet 12 is arranged. The test gas line 24 extends from the test gas inlet 12 through the sniffer probe 48 and into the interior of the housing 46. The proximal end of the sniffer probe 48 is detachably connected with the housing 46.

While the test gas inlet 12 is arranged at the foremost, distal end of the sniffer probe 48, the reference gas inlet 14 is arranged at the rearmost, proximal end of the housing 46 of the handpiece 44 so that the distance between the test gas inlet 12 and the reference gas inlet 14 is as large as possible. The gas outlet 28 is formed on one side of the housing in a distal end portion thereof so that the distance between the gas outlet 28 and the reference gas inlet 14 and the distance between the gas outlet 28 and the test gas inlet 12 are as equal and maximum as possible.

While an operator holds the handpiece 44 and guides it through a space, e.g. changes the spatial orientation of the handpiece and thus particularly the relative direction of a leak to be localized relative to the position of the handpiece, the switching valve 20 is switched back and forth at a constant frequency of approx. 10 Hz so that short gas pulses of the gas sucked in through the test gas inlet 12 and through the reference gas inlet 14 are alternately and successively supplied to the gas analyzer 16. The switching frequency of the switching valve 20 is selected to be so high (approx. 8-12 Hz) that the change in the spatial orientation of the handpiece 44 does not or only negligibly change the test gas concentration in the sucked in gas when the gas is sucked in through the test gas inlet 12 and when the gas is subsequently sucked in through the reference gas inlet 14. Alternatively, it is possible not to change the spatial orientation of the handpiece 44 while the gas is sucked in through the test gas inlet 12 and while the gas is subsequently sucked in through the reference gas inlet 14 and only to change the spatial orientation for the subsequent repeated measurement through the test gas inlet 12.

In the exemplary embodiment considered herein, the leak to be localized is a leak in a refrigerant system. Gaseous refrigerant escapes through the leak and forms a refrigerant cloud.

In a gas switching modulation, the difference in concentration between two measurement openings is determined by forming the difference between the measurement signal and a reference signal. By sufficiently large spatial separation of the measurement/test gas inlet and the reference gas inlet, the refrigerant gradient in the measurement cell is increased such that a rough localization of the leakage in the refrigerant clouds by means of gas switch modulation and an observation of the difference signal upon movement of the leak detector in space is enabled.

For this purpose, it is advisable to place the test gas inlet 12 at the tip of a gooseneck and to position the reference gas inlet 14 at the lower part of the handle.

Due to the relative measurement with a sufficiently large inlet distance between test gas inlet and reference gas inlet, the concentration gradient can already be detected by simply rotating the device and thereby the rough direction can be determined, thus guiding the user even faster to the source of the refrigerant cloud. Negative differential signals indicate that the leak is located such that it faces the rear side of the device.

After successfully determining, by means of this method, the system with the leakage, in the vicinity of which the refrigerant concentration is highest as the source of the refrigerant cloud, the leak can then be localized at said system. For this purpose, the valve is held in the measurement gas position in which the test gas inlet 12 is connected with the gas analyzer 16 and is thus switched to the proven continuous localization mode without gas switch modulation.

The invention claimed is:

1. A method for determining a relative orientation of a gas leak relative to a sniffer leak detector which comprises
    a handpiece with a sniffer probe and a test gas inlet,
    a reference gas inlet disposed at the handpiece remote from the test gas inlet,
    a gas analyzer, and
    a switching valve,
    wherein the switching valve is configured to alternately connect the test gas inlet with the gas analyzer and the reference gas inlet with the gas analyzer in a gas conducting manner, so that either a gas sucked in through the test gas inlet or a gas sucked in through the reference gas inlet is analyzed by the gas analyzer, comprising steps:
    a) supplying the gas sucked in through the test gas inlet to the gas analyzer,
    b) determining a test gas concentration in the gas supplied to the gas analyzer,
    c) switching the switching valve,
    d) supplying the gas sucked in through the reference gas inlet to the gas analyzer,
    e) analyzing a test gas concentration in the gas supplied to the gas analyzer,
    f) forming a differential signal from a difference of the test gas concentration determined according to step b) and the test gas concentration determined according to step e),
    g) changing a spatial orientation of the handpiece, while the position of the handpiece and the distance between the handpiece and a gas leak is not changed or only negligibly changed as compared to the change in the spatial orientation of the handpiece,
    h) repeating steps a)-f),
    i) determining whether the differential signal has changed after step h) compared to the differential signal according to f), and
    j) deducing the relative direction of a gas leak to be localized relative to the orientation of the handpiece by a change in the differential signal.

2. The method according to claim 1, wherein during step g), a position of the handpiece is not changed.

3. The method according to claim 1, wherein the steps a)-i) are repeated until the differential signal is minimum or maximum.

4. The method according to claim 1, wherein a spatial orientation of the sniffer probe is not changed between performing step a) and performing step d).

5. The method according to claim 1, wherein switching the switching valve according to step c) while performing steps a)-i) is performed with a switching frequency of at least 1 Hz.

6. The method according to claim 1, wherein the orientation of the handpiece is evaluated as an indication of a relative position of the leak to be localized if the differential signal is maximum or minimum.

7. The method according to claim 1, wherein a leak to be localized is assumed to be disposed on a geometric axis passing through the test gas inlet and through the reference gas inlet if the differential signal is maximum or minimum.

8. The method according to claim 1, wherein a leak to be localized is assumed to be disposed on a geometric axis which is traverse to an axis including the test gas inlet and the reference gas inlet if the differential signal is approximately or equal to zero.

9. The method according to claim 1, wherein by means of a position sensor or an acceleration sensor, a position or a change in position of the sniffer leak detector is detected and taken into account when determining a position of the leak.

10. The method according to claim 1, wherein a position of the sniffer leak detector is detected and its temporal course is recorded and correlated with the determined differential signal while performing at least one of the steps a)-i).

11. The method according to claim 1, wherein the differential signal or its change while performing at least one of the steps a)-i) are indicated to a user of the sniffer leak detector.

12. A method for determining the relative orientation of a gas leak relative to a sniffer leak detector which comprises
   a handpiece with a sniffer probe and a test gas inlet,
   a reference gas inlet disposed at the handpiece remote from the test gas inlet, the test gas inlet and reference gas inlet provided on opposite sides of the handpiece,
   a gas analyzer, and
   a switching valve,
   wherein the switching valve is configured to alternately connect the test gas inlet with the gas analyzer and the reference gas inlet with the gas analyzer in a gas conducting manner, so that either the gas sucked in through the test gas inlet or the gas sucked in through the reference gas inlet is analyzed by the gas analyzer, with the following steps:
   a) supplying gas sucked in through the test gas inlet to the gas analyzer,
   b) determining the test gas concentration in the gas supplied to the gas analyzer,
   c) switching the switching valve,
   d) supplying gas sucked in through the reference gas inlet to the gas analyzer,
   e) analyzing the test gas concentration in the gas supplied to the gas analyzer,
   f) forming a differential signal from the difference of the test gas concentration determined according to step b) and the test gas concentration determined according to step e),
   g) changing the spatial orientation of the handpiece,
   h) repeating steps a)-f),
   i) determining whether the differential signal has changed after step h) compared to the differential signal according to f),
   j) deducing the relative direction of a gas leak to be localized relative to the orientation of the handpiece by a change in the differential signal.

* * * * *